US008041042B2

(12) United States Patent
Ojanpera

(10) Patent No.: US 8,041,042 B2
(45) Date of Patent: Oct. 18, 2011

(54) METHOD, SYSTEM, APPARATUS AND COMPUTER PROGRAM PRODUCT FOR STEREO CODING

(75) Inventor: Juha Ojanpera, Nokia (FI)

(73) Assignee: Nokia Corporation, Espoo (FI)

( * ) Notice: Subject to any disclaimer, the term of this patent is extended or adjusted under 35 U.S.C. 154(b) by 1334 days.

(21) Appl. No.: 11/633,133

(22) Filed: Nov. 30, 2006

(65) Prior Publication Data

US 2008/0130903 A1 Jun. 5, 2008

(51) Int. Cl.

*H04R 5/00* (2006.01)
*H04R 29/00* (2006.01)
*G06F 17/00* (2006.01)
*G10L 19/00* (2006.01)

(52) U.S. Cl. ............... 381/23; 381/56; 700/94; 704/501

(58) Field of Classification Search .................... 381/23, 381/17–18, 19–22, 81, 123, 56; 700/94; 704/500–504

See application file for complete search history.

(56) References Cited

U.S. PATENT DOCUMENTS 5,539,829 A 7/1996 Lokhoff et al.
5,606,618 A 2/1997 Lokhoff et al.
5,625,745 A * 4/1997 Dorward et al. .............. 704/227
5,717,764 A 2/1998 Johnston et al.

FOREIGN PATENT DOCUMENTS

EP 0 376 553 A2 7/1990
EP 0 559 383 A1 9/1993

OTHER PUBLICATIONS

Painter T. et al., "*A Review of Algorithms for Perceptual Coding of Digital Audio Signals*," Digital Signal Processing Proceedings, 1997, DSP 97, 1997 13th International Conference on Santorini, Greece Jul. 2-4, 1997, NY, NY, USA, IEEE, vol. 1, Jul. 2, 1997, pp. 179-208.

International Search Report of corresponding PCT/IB2007/003399, mailed Apr. 4, 2008.

Zwicker et al., Psychoacoustics—Facts and Models, Book, 1990, Chapter 4, 30 Pages, Springer-Verlag, Berlin, Heidelberg, Germany.

Johnston et al., Sum-Difference Stereo Transform Coding, 1992, pp. II-569-II-572, IEEE.

(Continued)

*Primary Examiner* — Vivian Chin
*Assistant Examiner* — Douglas Suthers
(74) *Attorney, Agent, or Firm* — Alston & Bird LLP

(57) ABSTRACT

A method, system, apparatus and computer program product are provided for improved stereo coding. In particular, the method, system, apparatus and computer program product provide a technique for performing Mid-Side (M/S) stereo coding, in which an additional step is added to the coding process, whereby a parameter that is used in determining when the mid and side signals will be used instead of the left and right input signals is modified prior to making the selection between the signal pairs. In particular, the masking threshold associated with either the left or the right input signal may be modified based on a relationship between the energies of the two input signals. In addition, once the selection between the signal pairs has been made, the masking thresholds of the selected signals may be further modified, again based on a relationship between the energies of the left and right input signals.

25 Claims, 3 Drawing Sheets

OTHER PUBLICATIONS

Sperschneider et al., International Organisation for Standardisation Organisation Internationale de Normalisation/ISO/IECJTC1/SC29/WG11, Coding of Moving Pictures and Audio, Mar. 2004, 219 Pages, ISO/IEC 13818-7:2004 Audio Subgroup.

Office Action from parallel Chinese Patent Application No. 2007800433932 dated Apr. 21, 2011.

Machine Translation of Office Action from parallel Chinese Patent Application No. 2007800433932 dated Apr. 21, 2011.

Office Action from parallel Chinese Patent Application No. 2007800433932 dated Aug. 9, 2011.

English translation of Office Action from parallel Chinese Patent Application No. 2007800433932 dated Aug. 9, 2011.

* cited by examiner

METHOD, SYSTEM, APPARATUS AND COMPUTER PROGRAM PRODUCT FOR STEREO CODING

FIELD

Exemplary embodiments of the present invention relate generally to audio coding systems and, in particular, to a technique for improving the encoding conditions of a stereo signal.

BACKGROUND

In an audio encoding system an incoming time domain audio signal is compressed such that the bitrate needed to represent the signal is significantly reduced. Ideally, the bitrate of the encoded signal is such that it fits into the constraints of the transmission channel or minimizes the size of the encoded file. The former is typically being used in real-time communication and streaming services whereas the latter is being deployed more and more extensively when storing audio content locally or via downloading at high audio quality.

Typically the audio encoder aims to minimize the perceptual distortion at any given bitrate. However, the lower the bitrate, the more challenging it is to the encoder to satisfy the target bitrate and zero perceived distortion. Another encoding scenario is minimization of the encoded file size while keeping the perceptual distortion inaudible.

In both cases advanced encoding models and techniques need to be applied to maximize the end user experience. Typically it is the (encoding) performance with the worst-case signals (i.e., signals that are difficult to encode) that ultimately defines the overall performance of any encoding system. Another factor in defining the overall performance of any encoding system is the encoding speed and the resources needed in order for the given bitrate or audio quality level to be achieved. For commercial use, and especially for mobile use, encoding speed and memory requirements commonly play a significant role.

In an attempt to achieve lower bitrates without reducing the perceptual distortion, new audio coding methods should be explored and fully utilized. One of these methods that has been extensively used in state-of-the-art audio coding is efficient coding of stereo signals. Perceptual audio encoders encode the input signal in the frequency domain, as human auditory properties can be best described in the frequency domain. The spectral samples are typically quantized on a frequency band basis, and the quantizer shapes the quantization noise by either increasing or decreasing the corresponding quantizer step size until the noise is just below the auditory masking threshold.

On one hand, the introduced perceptual distortion is inaudible to the human ear. On the other hand, this limits the lowest possible bitrate. It is known from literature that coding of stereo signals can be best described and implemented by means of Mid-Side (M/S) and Intensity Stereo (IS) coding. In M/S stereo coding, the left and right (L/R) input channels are transformed into sum and difference signals. (See J. D. Johnston and A. J. Ferreira, “Sum-difference stereo transform coding”, *ICASSP*-92 *Conference Record,* 1992, pp. 569-572 (hereinafter “Johnston”), the contents of which are hereby incorporated herein by reference in their entirety). In particular, the mid channel is the average of the left and right channels, while the side channel is the difference between the two channels divided by two. The channel combination (i.e., L/R vs. M/S) requiring the lowest number of bits to achieve zero perceived distortion is then selected. For maximum coding efficiency this transformation is done both in a frequency and time dependant manner. M/S stereo coding is especially useful for high quality, high bitrate stereophonic coding.

In the attempt to achieve lower stereo bitrates, IS stereo coding has typically been used in combination with M/S coding. In IS coding, a portion of the spectra is coded only in mono mode and the stereo image is reconstructed by transmitting different scaling factors for the left and right channels. (See U.S. Pat. No. 5,539,829, entitled “Subband coded digital transmission system using some composite signal” to U.S. Philips Corporation, issued July 1996 (hereinafter “the ’829 patent.”) and U.S. Pat. No. 5,606,618, entitled “Subband coded digital transmission system using some composite signals” to U.S. Phillips Corporation, issued February, 1997 (hereinafter the ’618 patent.”), the contents of each of which are hereby incorporated herein by reference in their entirety). However, it is well known that IS stereo performs poorly at low frequencies thus limiting the usable bitrate range.

At low bitrates (e.g., below 1.5 bps), the use of M/S stereo coding is typically not able to preserve the full spatial image due to a shortage of available bits. Spectral leakage, also known as cross talk, from one channel to the other often occurs. This kind of degradation will have significant impact on output quality. The degradation is especially disturbing when the spatial image is not equally distributed between the left and right channels.

A need, therefore exists, for improving encoding across a range of bitrates.

BRIEF SUMMARY

In general, exemplary embodiments of the present invention provide an improvement over the known prior art by, among other things, providing a technique for achieving high stereophonic quality at any given bitrate. In particular, according to exemplary embodiments, when using Mid-Side (MS) stereo coding (i.e., transforming the left and right (L/R) input signals into mid and side signals (M/S) and selecting between the two signal pairs), prior to selecting between the L/R and M/S signals, a modification may be made to the masking thresholds used in making this decision based on the energy difference between the left and right input signals. When there is a large difference between the energy levels of the two input channels, this indicates that one of the input channels is perceptually more important than the other. This auditory feature should be included in the encoding process in order to obtain the best possible quality. As a result, according to exemplary embodiments, the masking threshold of the left or right signal having less energy will be scaled upwardly, indicating that a greater amount of noise is allowable without creating audible artifacts. A greater amount of allowable noise also decreases the amount of bits needed to encode the corresponding input channel, thus increasing the likelihood that the L/R input signal will be selected instead of its counterpart M/S signal. In cases where one of the input channels is perceptually more dominant than the other, the L/R input signals are preferred in order to limit the spreading of the channel cross-talk, which is typically perceived as quite an annoying artifact as such. In addition, in one exemplary embodiment, a further modification may be made to the final masking thresholds following the selection of L/R versus M/S signals and prior to quantization of the selected signals in order to create a better match between the desired bitrate and a number of available bits by the quantizer. This improves the quality of the perceptually more dominant input channel by assigning more allowable noise to the other channel. In case the quantizer starts to run out of bits, coarse quantization will occur to the perceptually less important input channel leaving more important bits for the encoding of the dominant channel.

In accordance with one aspect, a method of stereo coding is provided. In one exemplary embodiment, the method may include: (1) receiving a left and a right input signal; (2) deriving left and right masking thresholds associated with respective left and right input signals; and (3) modifying at least one of the left or the right masking thresholds based at least in part on a relationship between energy associated with respective left and right input signals.

In one exemplary embodiment, the method may further include determining the energy associated with respective left and right input signals. The energy associated with one of the left or right input signals will comprise a maximum energy, while the energy associated with the other input signals will comprise a minimum energy. A scale value can then be determined based at least in part on a ratio of the maximum energy to the minimum energy. This scale value may be compared to a predetermined threshold and, where the scale value exceeds the predetermined threshold, the method may further include modifying the masking threshold associated with the input signal comprising the minimum energy.

According to this exemplary embodiment, modifying the masking threshold may involve multiplying the derived masking threshold by a threshold scale that is equal to the smaller of a predefined value or the determined scale value.

In another exemplary embodiment, the method may further include determining a mid and a side signal based at least in part on the left and right input signals. In one exemplary embodiment, this may involve averaging the left and right input signals in order to determine the mid signal and taking the difference between the left and right input signals and dividing the difference by two to determine the side signal. The method may further include then selecting between the left and right input signals and the mid and side input signals based at least in part on the left and right masking thresholds. In this exemplary embodiment, the step of modifying the left or right masking threshold may be performed prior to selecting between the two signal pairs. Selecting between the two signal pairs may involve determining a first combined perceptual entropy associated with the left and right input signals based at least in part on the left and right masking thresholds; determining a second combined perceptual entropy associated with the mid and side signals based at least in part on mid and side masking thresholds; and comparing the first and second combined perceptual entropies to determine which is lower.

In yet another exemplary embodiment, the method may also include further modifying at least one of the left or the right masking thresholds, where the left and right input signals are selected, or further modifying at least one of the mid or side masking thresholds, where the mid and side signals are selected. The selected signals may then be quantized based at least in part on the corresponding masking thresholds.

In accordance with another aspect, an apparatus is provided for stereo coding. In one exemplary embodiment, the apparatus may include an encoder that is configured to: (1) receive left and right input signals; (2) derive left and right masking thresholds associated with respective left and right input signals; and (3) modify at least one of the left or the right masking thresholds based at least in part on a relationship between energy associated with respective left and right input signals.

According to yet another aspect, an apparatus is provided that is configured to perform stereo coding. In one exemplary embodiment, the apparatus may include: (1) means for receiving a left and a right input signal; (2) means for deriving left and right masking thresholds associated with respective left and right input signals; and (3) means for modifying at least one of the left or the right masking thresholds based at least in part on a relationship between energy associated with respective left and right input signals.

In accordance with yet another aspect, a computer program product is provided for stereo coding. The computer program product contains at least one computer-readable storage medium having computer-readable program code portions stored therein. The computer-readable program code portions of one exemplary embodiment include: (1) a first executable portion for receiving a left and a right input signal; (2) a second executable portion for deriving left and right masking thresholds associated with respective left and right input signals; and (3) a third executable portion for modifying at least one of the left or the right masking thresholds based at least in part on a relationship between energy associated with respective left and right input signals.

BRIEF DESCRIPTION OF THE SEVERAL VIEWS OF THE DRAWING(S)

Having thus described exemplary embodiments of the invention in general terms, reference will now be made to the accompanying drawings, which are not necessarily drawn to scale, and wherein:

DETAILED DESCRIPTION

Exemplary embodiments of the present invention now will be described more fully hereinafter with reference to the accompanying drawings, in which some, but not all embodiments of the inventions are shown. Indeed, exemplary embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview:

In general, exemplary embodiments of the present invention provide an improved technique for performing Mid-Side (M/S) stereo coding that may deliver improved stereo quality at all bitrates, including low bitrates. According to exemplary embodiments, an additional step is added to the coding process, whereby a parameter that is used in determining when the mid and side signals will be used instead of the left and right input signals is modified prior to making the selection between the signal pairs. In particular, the masking threshold associated with either the left or the right input signal may be modified based on a relationship between the energies of the two input signals. For example, where a ratio of the maximum energy of the left and right input signals to the minimum energy of the two signals exceeds a predetermined threshold, the masking threshold associated with the input signal having the least energy (i.e., the minimum energy) of the two signals may be scaled. The result of this scaling is such that the L/R signal will be selected instead of its counterpart M/S signal in the instance where one of the input channels is perceptually more important than the other. This is beneficial since L/R input signals are preferred in cases where the energy levels between the two input channels show a large difference. In addition, according to one exemplary embodiment, once the selection between the signal pairs has been made, the masking thresholds of the selected signals may further be modified, again based on a relationship between the energies of the left and right input signals. This further modification improves the match between the desired bitrate and the number of available bits for quantization. In particular, this embodiment improves the quality of the perceptually more dominant input channel by assigning more allowable noise to the other channel. In the instance where the quantizer starts to run out of bits, coarse quantization will occur to the perceptually less important input channel leaving more important bits for the encoding of the dominant channel.

Overall System and Generalized M/S Stereo Encoder

Figure 1:
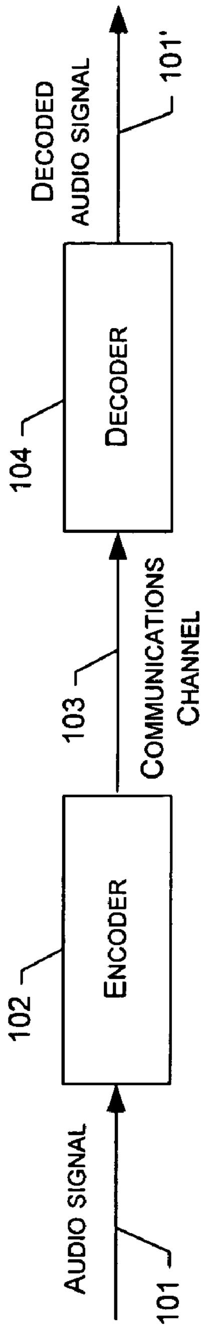
FIG. 1 is a block diagram of an encoding and decoding system that would benefit from exemplary embodiments of the present invention.

Reference is now made to FIG. 1, which provides a basic block diagram of an overall audio coding and decoding system according to exemplary embodiments of the present invention. As shown, the overall system may include an encoder 102 (e.g., an Advanced Audio Coding (AAC) encoder, or an Enhanced AAC encoder with Spectral Band Replication (eAAC+)) configured to receive an audio signal 101, to encode the signal, for example in a manner discussed below, and to transmit the encoded audio signal over a communication channel 103 to a decoder 104.

Figure 2:
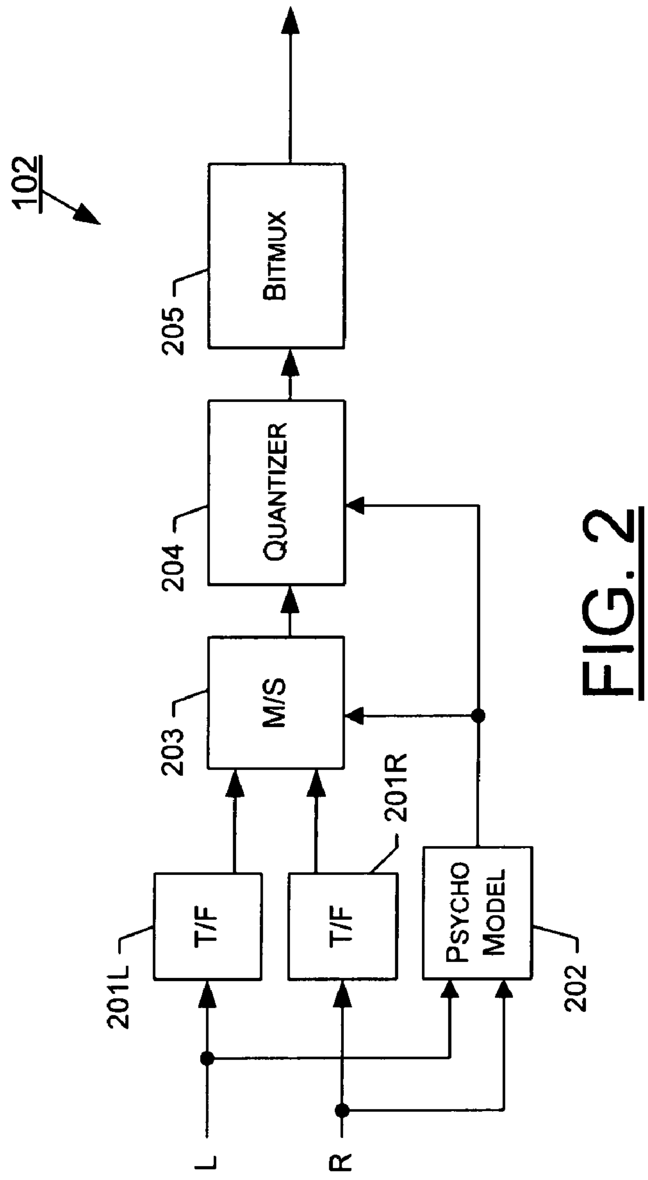
FIG. 2 is a schematic block diagram of an encoder in accordance with exemplary embodiments of the present invention.

In particular, as shown in FIG. 2, which provides a more detailed illustration of the encoder 102 according to one exemplary embodiment, the encoder 102 may include left and right time-frequency mappers 201L and 201R configured to receive left and right audio input signals, respectively, in the time domain and to convert these signals into the frequency domain using, for example, a Fourier transform. The encoder 102 may further include a means, such as a threshold generation processing element 202, for generating left, right, mid and side masking thresholds, $thr_L$, $thr_R$, $thr_M$ and $thr_S$. The generated masking thresholds define the allowed noise that can be introduced into each spectral band without creating audible artifacts and are based on the left and right audio input signals received by the encoder 102, as well as a psychoacoustical model. The details and implementation of the model used are outside the scope of exemplary embodiments of this invention, but can be based on, for example, models described in Chapter 4 of E. Zwicker, H. Fastl, "Psychoacoustics, Facts and Models," Springer-Verlag, 1990, or ISO/IEC JTC1/SC29/WG11 (MPEG-2 AAC), Generic Coding of Moving Pictures and Associated Audio, Advanced Audio Coding, International Standard 13818-7, ISO/IEC, 1997.

In addition, the encoder 102 may include a means, such as a transformation and selection processing element 203, for transforming the left and right input signals into mid and side signals and for selecting which of the combination of signals will be used. In particular, as discussed above, the mid signal may be generated by averaging the left and right input signals, while the side signal may be generated by taking the difference between the two signals and dividing by two. Once the mid and side signals have been generated, a determination may be made as to which signals (i.e., L/R or M/S) require the lowest bitrate or produce the greatest coding gain. As discussed in more detail below, exemplary embodiments of the present invention improve upon this decision-making process by modifying one of the masking thresholds generated by 202 based on the energy difference between the left and right input signals. By modifying the masking thresholds the L/R signals instead of their counterpart M/S signals will be selected in the instance where one of the two input channels is more perceptually dominant than the other.

The encoder 102 may further include a quantizer 204 configured to quantize the selected signals (i.e., either the L/R signals or the M/S signals) in order to achieve the desired bitrate, and a bitstream multiplexer 205 configured to create a bit stream based on the output of the quantizer 204. As one of ordinary skill in the art will recognize, any of the above elements of the encoder 102 may comprise various means for performing one or more of the above described functions in accordance with exemplary embodiments of the present invention, including those more particularly shown and described herein. It should be understood, however, that one or more of the elements may include alternative means for performing one or more like functions, without departing from the spirit and scope of the present invention. As such, the elements of the encoder 102 may comprise entirely hardware components, entirely software components, or any combination of hardware and software components. For example, the threshold generation processing element 202 and/or the transformation and selection processing element 203, may be embodied in a common or different processing element, such as a microprocessor, Application Specific Integrated Circuit (ASIC), or the like.

Returning to FIG. 1, upon receipt of the encoded signal, the decoder 104 may then be configured to decode the received signal in order to output the original decoded audio signal 101'. As is known by those of ordinary skill in the art, any number of electronic devices (e.g., cellular telephones, personal digital assistants (PDAs), laptops, personal computers (PCs), etc.) may comprise the encoder 102 and decoder 104 discussed above. By way of example, reference is now made to FIG. 3, which illustrates one type of electronic device that may comprise either the encoder 102 or decoder 104 discussed above. As shown, the electronic device may be a mobile station 10, and, in particular, a cellular telephone. It should be understood, however, that the mobile station illustrated and hereinafter described is merely illustrative of one type of electronic device that would benefit from the present invention and, therefore, should not be taken to limit the scope of the present invention. While several embodiments of the mobile station 10 are illustrated and will be hereinafter described for purposes of example, other types of mobile stations, such as PDAs, pagers, laptop computers, as well as other types of electronic systems including both mobile, wireless devices and fixed, wireline devices, can readily employ embodiments of the present invention.

Figure 3:
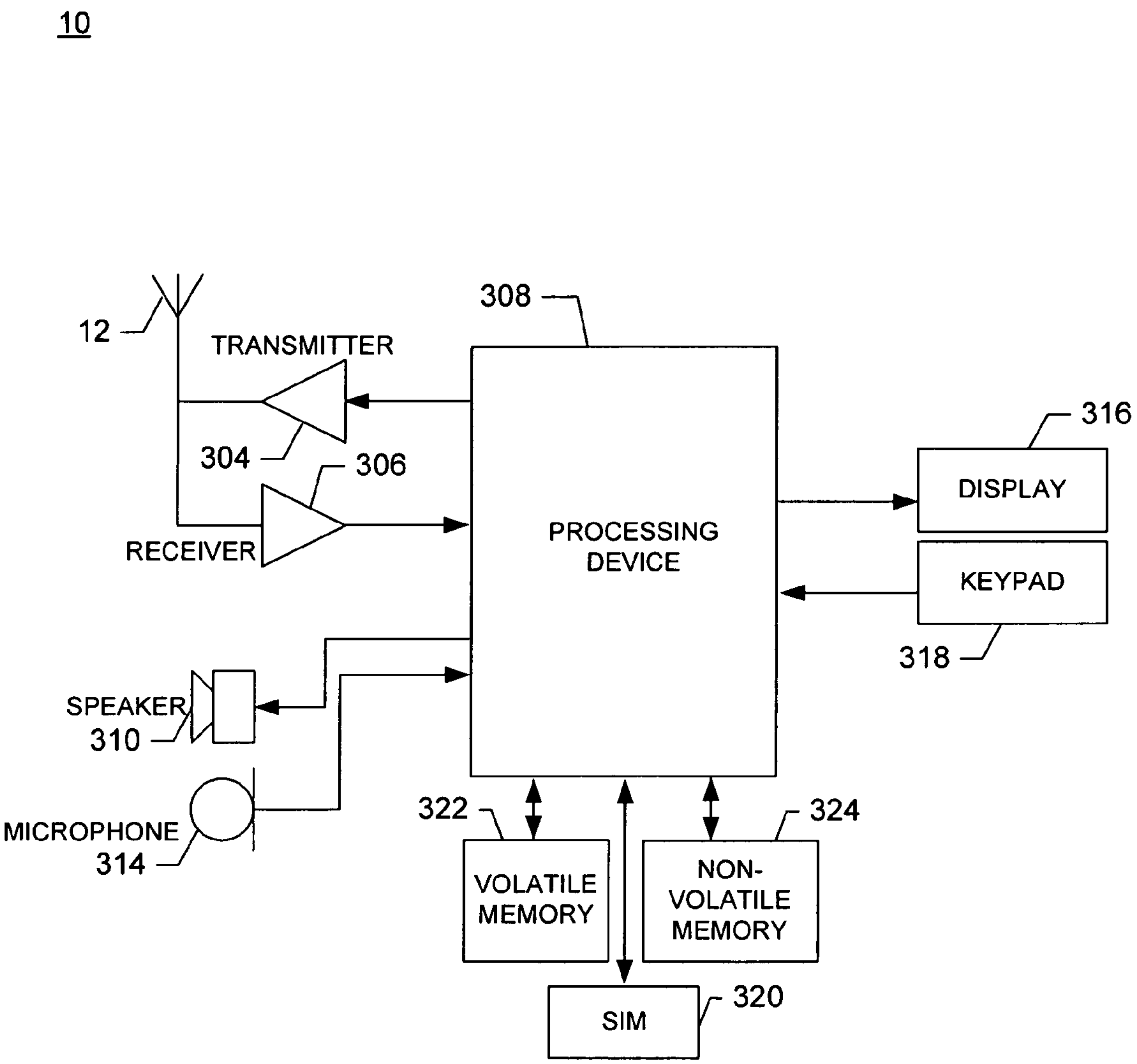
FIG. 3 is a schematic block diagram of a mobile station capable of operating in accordance with an exemplary embodiment of the present invention.

The mobile station includes various means for performing one or more functions in accordance with exemplary embodiments of the present invention, including those more particularly shown and described herein. It should be understood, however, that the mobile station may include alternative means for performing one or more like functions, without departing from the spirit and scope of the present invention. More particularly, for example, as shown in FIG. 3, in addition to an antenna 12, the mobile station 10 includes a transmitter 304, a receiver 306, and means, such as a processing device 308, e.g., a processor, controller or the like, that provides signals to and receives signals from the transmitter 304 and receiver 306, respectively. These signals include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 308, such as a processor, controller or other computing device, includes the circuitry required for implementing the video, audio, and logic functions of the mobile station and is capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processing device 308 thus also includes the functionality to convolutionally encode and interleave message and data prior to modulation and transmission. Further, the processing device 308 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

In one exemplary embodiment, not shown, the processing element 308 may include the encoder 102 and/or decoder 104 discussed above with reference to FIGS. 1 and 2. Alternatively, the encoder 102 and/or decoder 104 may be discrete components communicatively coupled to the processing element 308.

The mobile station may also comprise means such as a user interface including, for example, a conventional earphone or speaker 310, a microphone 314, a display 316, all of which are coupled to the controller 308. The user input interface, which allows the mobile device to receive data, can comprise any of a number of devices allowing the mobile device to receive data, such as a keypad 318, a touch display (not shown), a microphone 314, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 320, a removable user identity module (R-UIM) (not shown), or the like, which typically stores information elements related to a mobile subscriber. In addition to the SIM, the mobile device can include other memory. In this regard, the mobile station can include volatile memory 322, as well as other non-volatile memory 324, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, in one embodiment of the present invention, the memory may store computer program code for performing the steps of improved Mid-Side stereo coding discussed below with reference to FIG. 4.

The method, system, apparatus and computer program product of exemplary embodiments of the present invention are primarily described in conjunction with mobile communications applications. It should be understood, however, that the method, system, apparatus and computer program product of embodiments of the present invention can be utilized in conjunction with a variety of other applications, both in the mobile communications industries and outside of the mobile communications industries. For example, the method, system, apparatus and computer program product of exemplary embodiments of the present invention can be utilized in conjunction with wireline and/or wireless network (e.g., Internet) applications.

Method of Mid-Side Stereo Coding

Figure 4:
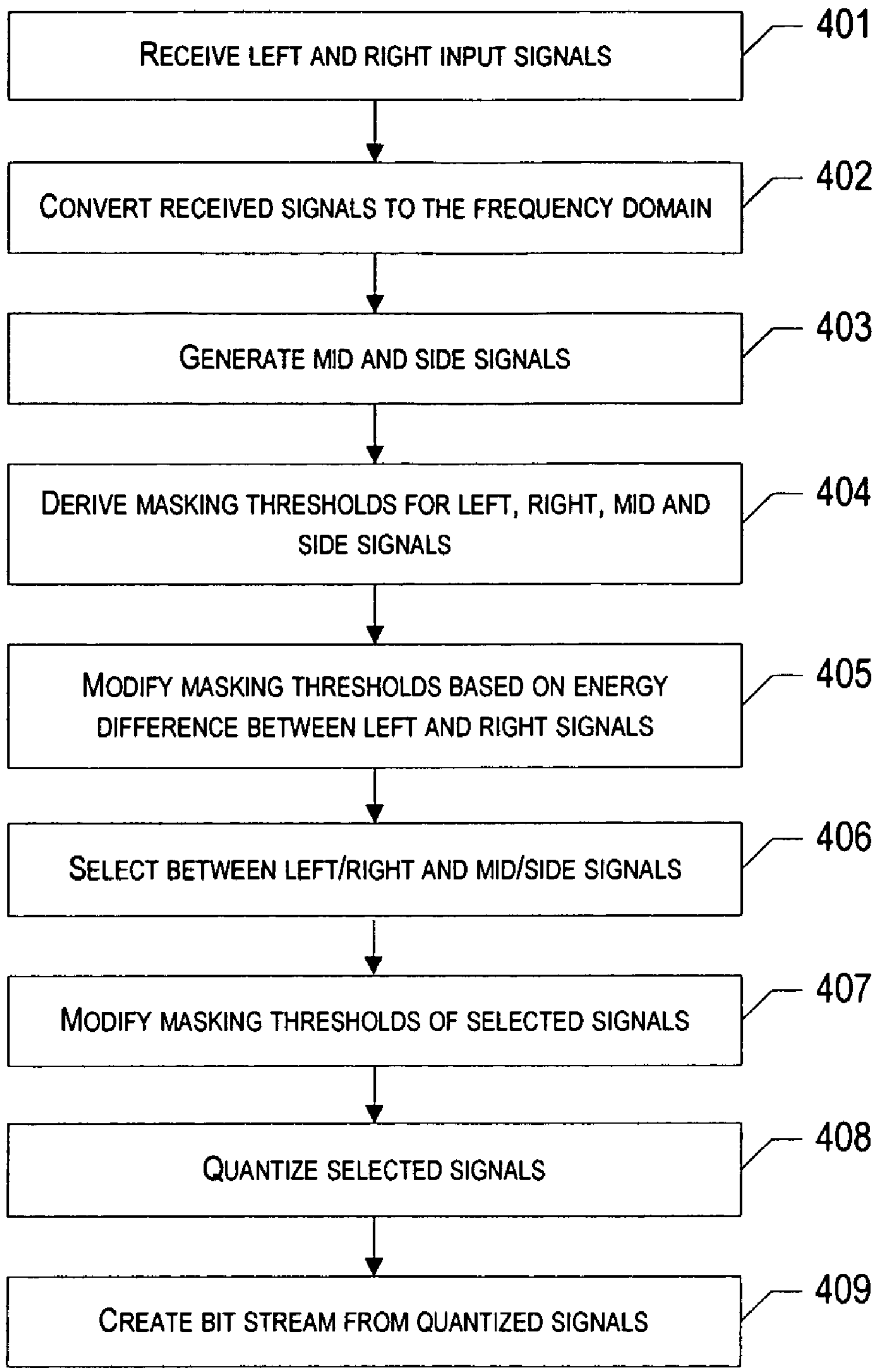
FIG. 4 is a flow chart illustrating operations which may be taken in order to provide improved Mid-Side stereo coding in accordance with exemplary embodiments of the present invention.

Referring now to FIG. 4, a method of performing M/S stereo coding in accordance with exemplary embodiments of the present invention will now be described. As shown, the process begins at Operation 401 where left and right time domain input signals $L_t$ and $R_t$ are received by the encoder 102. In Operation 402, the received signals $L_t$ and $R_t$ may be converted into frequency domain signals $L_f$ and $R_f$, such as by left and right time-frequency mappers 201L and 201R, respectively, according to equation 1:

$$L_f=F(L_t);\text{ and}$$

$$R_f=F(R_t) \qquad \text{Eqn. 1}$$

where F( ) denotes time-to-frequency transformation.

Next, in Operation 403, mid and side frequency domain signals $M_f$ and $S_f$ may be generated, such as by the transformation and selection processing element 203, according to the following equations:

$$M_f=(L_f+R_f)/2;\text{ and}$$

$$S_f=(L_f-R_f)/2 \qquad \text{Eqn. 2}$$

According to one exemplary embodiment, sfbOffset of length M represents the boundaries of the frequency bands for which M/S stereo coding is performed. Ideally this length follows also the boundaries of the critical bands of human auditory system.

In Operation 404, the masking thresholds $thr_L$, $thr_R$, $thr_M$ and $thr_S$ of $L_f$, $R_f$, $M_f$ and $S_f$, respectively, may be derived from the spectral input signals based on a psychoacoustical model, as represented by the threshold generation processing element 202. As discussed above, the details and implementation of this model are known to those skilled in the art. In one exemplary embodiment, common making thresholds may be derived for the left, right, mid and/or side signals. Alternatively, the masking thresholds may differ for each, or any combination of, the signals.

According to conventional M/S stereo encoding systems, the next step would be to select between the L/R input signals and the M/S input signals based on the perceptual entropy of the given signals (i.e., based on an estimate of the minimum number of bits needed for the current frame to achieve zero perceived distortion). However, at low bitrates, the selection and subsequent quantization fail to perform efficiently due to a low number of available bits for coding of $Q_{f1}$ and $Q_{f2}$ (i.e., the quantized signals). Thus, according to exemplary embodiments of the present invention, in order to significantly improve the stereo quality at all bitrates, prior to making the selection between L/R signals and M/S signals, a modification may be made to the derived masking thresholds, such as by the transformation and selection processing element 203, based on the energy difference between the left and right received input signals. (Operation 405).

In particular, let $E_L$ and $E_R$ represent the frame energies of the left and right input channels, respectively.

$$E_L = \sum_{j=0}^{N-1} L_f(j)^2 \qquad \text{Eqn. 3}$$

$$E_R = \sum_{j=0}^{N-1} R_f(j)^2$$

where j represents the indices of the scalefactor band.

One of the input masking thresholds may then be modified according to the following:

If, scale>2, then Eqn. 6;

Otherwise, do-nothing Eqn. 4 where $$\text{scale}=0.7\cdot\text{prevScale}+(\text{MAX}(E_L,E_R)/\text{MIN}(E_L,E_R))\cdot 0.3 \qquad \text{Eqn. 5}$$

where prevScale is initialized to zero at startup and represents the scale value of the previous frame, and where MAX and MIN represent the maximum and minimum of the specified parameters, respectively.

Furthermore,

If $E_L > E_R$, then A;

Otherwise, B Eqn. 6a where $$A: thr_R(i)=thr_R(i)\cdot thr\text{Scale},$$

$$B: thr_L(i)=thr_L(i)\cdot thr\text{Scale},\ 0\leqq i<M \qquad \text{Eqn. 6b}$$

where i represents the indices of the spectral bin, M represents the length of sfbOffset, or the boundaries of the frequency bands (as indicated above), and $$thr\text{Scale}=\text{MIN}(20,\ \text{scale}) \qquad \text{Eqn. 6c}$$

In other words, the energies of the left and right input channels are compared. If the ratio between the two energies is more than a given threshold value, the masking threshold of the channel having the smaller of the two energies is scaled. In particular, as can be seen, according to one exemplary embodiment, a three decibel energy difference may trigger the modification of one of the masking thresholds in order to achieve a better decision of whether the M/S should be activated for the spectral band or not (i.e., whether the M/S signals should be used instead of the L/R signals).

Returning to FIG. 4, in Operation 406, the determination is finally made as to whether to replace the L/R signals with the M/S signals. As briefly noted above, the determination is made based on the perceptual entropy (PE) of the various signals. Computation of perceptual entropy uses the derived masking thresholds, which may or may not have been modified in Operation 404 above. In particular, an estimate of the number of bits needed for each spectral bin (i.e., PE) may be calculated as follows:

$$PE(X, T, i, j, k) = \log_2\left(\text{round}\left(X_j^2(i)\cdot\frac{k}{6\cdot T_j}\right)\right) \qquad \text{Eqn. 7}$$

where, as noted above, i and j are the indices of spectral bin and scalefactor band, respectively, $T_j$ represents the masking threshold in band j, k is the width of band j, and $X_j$ is the spectral value in band j.

The signal configuration that gives the minimum bit count is then selected for quantization, such as by quantizer 204. This selection is done on a spectral band basis, and each spectral band is assigned one signaling bit that is used by the receiving end to detect whether the mid and side signals were sent instead of the left and right channel signals. This information can then eventually be used in order to convert the M/S signals back to L/R channel signals.

The selection may be performed as follows:

$$MSFlags(i) = \begin{cases} \text{'1'} & PE_{MS} < PE_{LR} \\ \text{'0'}, & \text{otherwise} \end{cases},\ 0 \le i < M \qquad \text{Eqn. 8}$$

where $$PE_{MS} = \sum_{j=0}^{fLen-1} PE(M_f, thr_M, j, i, fLen) + \sum_{j=0}^{fLen-1} PE(S_f, thr_S, j, i, fLen) \qquad \text{Eqn. 9}$$

$$PE_{LR} = \sum_{j=0}^{fLen-1} PE(L_f, thr_L, j, i, fLen) + \sum_{j=0}^{fLen-1} PE(R_f, thr_R, j, i, fLen)$$

where fLen represents the length of the ith frequency band and can be calculated based on the following equation:

$$fLen=sfb\text{Offset}(i+1)-sfb\text{Offset}(i) \qquad \text{Eqn. 10}$$

The signals to be quantized are then:

$$Q_{f1} = \begin{cases} L_f(sfbOffset(i), \ldots, sfbOffset(i+1)), & MSFlags(i) = \text{'0'} \\ M_f(sfbOffset(i), \ldots, sfbOffset(i+1)), & \text{otherwise} \end{cases} \qquad \text{Eqn. 11}$$

$$Q_{f2} = \begin{cases} R_f(sfbOffset(i), \ldots, sfbOffset(i+1)), & MSFlags(i) = \text{'0'} \\ S_f(sfbOffset(i), \ldots, sfbOffset(i+1)), & \text{otherwise} \end{cases}$$

Equation 11 is repeated for $0\leqq i<M$.

In other words, for each spectral band, the perceptual entropy is calculated for the combination of left and right input signals and mid and side signals. Where the perceptual entropy for the mid and side signals is less than the perceptual entropy for the left and right signals (i.e., where the minimum number of bits needed for the current frame of the mid and side signals to achieve zero perceived distortion is less than that for the current frame of the left and right signals), then the mid and side signals are selected for quantization. This is repeated for each spectral band. Note that the perceptual entropy is a function of the masking thresholds that were derived in Operation 404 and, in some instances, modified in Operation 405.

Following selection of the signals for quantization, in Operation 407, according to one exemplary embodiment, the masking thresholds may again be modified in order to create a better match between a desired bitrate and the number of available bits for the quantizer. In particular, the modification may be performed as follows:

$$\begin{cases} \begin{cases} C, & E_L > E_R \\ D, & \text{otherwise} \end{cases}, & bps < 1.5 \\ \text{do\_nothing} & \text{otherwise} \end{cases} \quad \text{Eqn. 12}$$

$$C{:}thr_{R/S}(i) = thr_{R/S}(i) \cdot thrScale,$$

$$D{:}thr_{L/M}(i) = thr_{L/M}(i) \cdot thrScale, \quad 0 \le i < M$$

$$thrScale = \text{MIN}(10, \text{scale})$$

In other words, if the number of bits per sample is less than 1.5, then the energy levels of the left and right inputs signals may again be compared. Where the energy of the left signal is greater, then the masking threshold of the right or side signal, whichever was selected in Operation 406 above, may be modified based on a scaling factor. Where the energy of the right signal is greater, the masking threshold of the left or mid signal may be modified. If, on the other hand, the number of bits per sample is not less than 1.5 (i.e., is equal to or greater than 1.5), then no modification to the masking thresholds may be performed. This is repeated for each spectral band of the input signal.

Finally, in Operation 408, the selected signals may be quantized by quantizer 204 in order to meet the required bitrate and, in Operation 409, the quantized signal is converted into a bit stream by a bit stream multiplexer 205.

CONCLUSION

Based on the foregoing description, exemplary embodiments of the present invention may improve the stereo image reconstruction at low bitrates. This improvement is especially clear when the spatial image is not equally distributed between left and right input signals. Using exemplary embodiments of the present invention cross talk between channels can be reduced, thus improving the overall spatial image quality. In addition, according to exemplary embodiments, the quality of the signal is able to be preserved when the stereo content is equally distributed between the left and right channels, causing there to be no performance penalty compared to conventional solutions.

As described above and as will be appreciated by one skilled in the art, embodiments of the present invention may be configured as a method, system or apparatus. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these exemplary embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:

receiving a left and a right input signal;

deriving left and right masking thresholds associated with respective left and right input signals;

determining the energy associated with respective left and right input signals, wherein the energy associated with one of the left or right input signals comprises a maximum energy and the energy associated with the other of the left or right input signals comprises a minimum energy;

determining a scale value based at least in part on a ratio of the maximum energy to the minimum energy;

comparing the scale value to a predetermined threshold; and in an instance in which the scale value exceeds the predetermined threshold, modifying the masking threshold associated with the input signal comprising the minimum energy.

2. The method of claim 1, wherein modifying the masking threshold comprises multiplying the derived masking threshold by a threshold scale, said threshold scale equal to the smaller of a predefined value or the determined scale value.

3. The method of claim 1 further comprising:

determining a mid and a side signal based at least in part on the left and right input signals; and selecting between the left and right input signals and the mid and side signals based at least in part on the left and right masking thresholds.

4. The method of claim 3, wherein the left or right masking threshold is modified prior to selecting between the left and right input signals and the mid and side signals.

5. The method of claim 3, wherein selecting between the left and right input signals and the mid and side signals comprises:

determining a first combined perceptual entropy associated with the left and right input signals, said first combined perceptual entropy based at least in part on the left and right masking thresholds;

determining a second combined perceptual entropy associated with the mid and side signals, said second combined perceptual entropy based at least in part on mid and side masking thresholds; and comparing the first and second combined perceptual entropies to determine which is lower.

6. The method of claim 3, wherein determining the mid signal comprises averaging the left and right input signals, and wherein determining the side signal comprises taking the difference between the left and right input signals and dividing the difference by two.

7. The method of claim 3 further comprising:

where the left and right input signals are selected, further modifying at least one of the left or the right masking thresholds;

where the mid and side signals are selected, further modifying at least one of a mid or a side masking thresholds; and quantizing the selected signals based at least in part on the corresponding masking thresholds.

8. An apparatus comprising:

at least one processor; and at least one memory including computer program code, the at least one memory and the computer program code configured to, with the at least one processor, cause the apparatus to perform at least the following:

receive left and right input signals;

derive left and right masking thresholds associated with respective left and right input signals;

determine the energy associated with respective left and right input signals, wherein the energy associated with one of the left or right input signals comprises a maximum energy and the energy associated with the other of the left or right input signals comprises a minimum energy;

determine a scale value based at least in part on a ratio of the maximum energy to the minimum energy;

compare the scale value to a predetermined threshold; and in an instance in which the scale value exceeds the predetermined threshold, modify the masking threshold associated with the input signal comprising the minimum energy.

9. The apparatus of claim 8, wherein in order to modify the masking threshold, the at least one memory and the computer program code are further configured to, with the at least one processor, cause the apparatus to multiply the derived masking threshold by a threshold scale, said threshold scale equal to the smaller of a predefined value or the determined scale value.

10. The apparatus of claim 8, wherein the at least one memory and the computer program code are further configured to, with the at least one processor, cause the apparatus to:

determine a mid and a side signal based at least in part on the left and right input signals; and select between the left and right input signals and the mid and side signals based at least in part on the left and right masking thresholds.

11. The apparatus of claim 10, wherein the at least one memory and the computer program code are further configured to, with the at least one processor, cause the apparatus to modify the left or right masking threshold prior to selecting between the left and right input signals and the mid and side signals.

12. The apparatus of claim 10, wherein the at least one memory and the computer program code are further configured to, with the at least one processor, cause the apparatus to:

where the left and right input signals are selected, further modify at least one of the left or the right masking thresholds; and where the mid and side signals are selected, further modify at least one of a mid or a side masking thresholds.

13. The apparatus of claim 12, wherein the apparatus further comprises:

a quantizer configured to quantize the selected signals based at least in part on the corresponding masking thresholds.

14. An apparatus comprising:

means for receiving a left and a right input signal;

means for deriving left and right masking thresholds associated with respective left and right input signals;

means for determining the energy associated with respective left and right input signals, wherein the energy associated with one of the left or right input signals comprises a maximum energy and the energy associated with the other of the left or right input signals comprises a minimum energy;

means for determining a scale value based at least in part on a ratio of the maximum energy to the minimum energy;

means for comparing the scale value to a predetermined threshold; and means for modifying the masking threshold associated with the input signal comprising the minimum energy, in an instance in which the scale value exceeds the predetermined threshold.

15. The apparatus of claim 14, wherein the means for modifying the masking threshold comprises means for multiplying the derived masking threshold by a threshold scale, said threshold scale equal to the smaller of a predefined value or the determined scale value.

16. The apparatus of claim 14 further comprising:

means for determining a mid and a side signal based at least in part on the left and right input signals; and means for selecting between the left and right input signals and the mid and side signals based at least in part on the left and right masking thresholds.

17. The apparatus of claim 16, wherein the means for modifying the left or right masking threshold comprises means for modifying the left or right masking threshold prior to selecting between the left and right input signals and the mid and side signals.

18. The apparatus of claim 16, wherein the means for selecting between the left and right input signals and the mid and side signals further comprises:

means for determining a first combined perceptual entropy associated with the left and right input signals, said first combined perceptual entropy based at least in part on the left and right masking thresholds;

means for determining a second combined perceptual entropy associated with the mid and side signals, said second combined perceptual entropy based at least in part on mid and side masking thresholds; and means for comparing the first and second combined perceptual entropies to determine which is lower.

19. The apparatus of claim 16 further comprising:

means for further modifying at least one of the left or the right masking thresholds, where the left and right input signals are selected;

means for further modifying at least one of a mid or a side masking thresholds, where the mid and side signals are selected; and means for quantizing the selected signals based at least in part on the corresponding masking thresholds.

20. A computer program product, wherein the computer program product comprises at least one tangible computer-readable storage medium having computer-readable program code portions stored therein, the computer-readable program code portions comprising:

a first executable portion for receiving a left and a right input signal;

a second executable portion for deriving left and right masking thresholds associated with respective left and right input signals;

a third executable portion for determining the energy associated with respective left and right input signals, wherein the energy associated with one of the left or right input signals comprises a maximum energy and the energy associated with the other of the left or right input signals comprises a minimum energy;

a fourth executable portion for determining a scale value based at least in part on a ratio of the maximum energy to the minimum energy;

a fifth executable portion for comparing the scale value to a predetermined threshold; and a sixth executable portion for modifying the masking threshold associated with the input signal comprising the minimum energy, in an instance in which the scale value exceeds the predetermined threshold.

21. The computer program product of claim 20, wherein the sixth executable portion is configured to multiply the derived masking threshold by a threshold scale, said threshold scale equal to the smaller of a predefined value or the determined scale value.

22. The computer program product of claim 20 further comprising:

a seventh executable portion for determining a mid and a side signal based at least in part on the left and right input signals; and an eighth executable portion for selecting between the left and right input signals and the mid and side signals based at least in part on the left and right masking thresholds.

23. The computer program product of claim 22, wherein the sixth executable portion is configured to modify the left or right masking threshold prior to the eighth executable portion selecting between the left and right input signals and the mid and side signals.

24. The computer program product of claim 22, wherein the eighth executable portion is configured to:

determine a first combined perceptual entropy associated with the left and right input signals, said first combined perceptual entropy based at least in part on the left and right masking thresholds;

determine a second combined perceptual entropy associated with the mid and side signals, said second combined perceptual entropy based at least in part on mid and side masking thresholds; and compare the first and second combined perceptual entropies to determine which is lower.

25. The computer program product of claim 22 further comprising:

a ninth executable portion for further modifying at least one of the left or the right masking thresholds, where the left and right input signals are selected;

a tenth executable portion for further modifying at least one of a mid or a side masking thresholds, where the mid and side signals are selected; and an eleventh executable portion for quantizing the selected signals based at least in part on the corresponding masking thresholds.

* * * * *